(12) United States Patent
Abe

(10) Patent No.: US 6,423,276 B1
(45) Date of Patent: *Jul. 23, 2002

(54) HEATER UNIT

(75) Inventor: Fumio Abe, Handa (JP)

(73) Assignee: NGK Insulators, Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/161,502

(22) Filed: Sep. 28, 1998

(30) Foreign Application Priority Data

Oct. 28, 1997 (JP) .............................................. 9-295389

(51) Int. Cl.$^7$ ........................... F01N 3/28; B01D 53/88; B01D 53/92
(52) U.S. Cl. ....................... 422/174; 422/177; 422/179; 422/180
(58) Field of Search ................... 60/300, 303; 422/174, 422/179, 180, 199, 177

(56) References Cited

U.S. PATENT DOCUMENTS

| | | | | |
|---|---|---|---|---|
| 5,463,206 A | * | 10/1995 | Abe et al. .................... | 219/553 |
| 5,526,462 A | * | 6/1996 | Kondo et al. ................ | 422/180 |
| 5,599,509 A | * | 2/1997 | Toyao et al. ................. | 422/180 |
| 5,614,155 A | * | 3/1997 | Abe et al. .................... | 422/174 |

FOREIGN PATENT DOCUMENTS

| | | | |
|---|---|---|---|
| EP | 0618353 | * | 10/1994 |
| JP | 7-259543 | | 10/1995 |
| JP | 8-4521 | | 1/1996 |
| WO | 89/10470 | * | 11/1989 |
| WO | 94/18441 | * | 8/1994 |

* cited by examiner

*Primary Examiner*—Hien Tran
(74) *Attorney, Agent, or Firm*—Parkhurst & Wendel, LLP

(57) ABSTRACT

A heater unit includes a metallic casing, and a honeycomb heater held in the casing via a metallic holding member, comprising a metallic honeycomb structure having a large number of parallel passages extending in the direction of the flow of an exhaust gas passing through the heater unit and at least one electrode for electrical heating of the honeycomb structure, attached to the honeycomb structure. In the heater unit, the holding member has such a structure as (1) is fitted to part of the outer surface of the honeycomb heater to allow the honeycomb heater to have a stable shape and (2) substantially blocks the flow path of exhaust gas between the honeycomb heater and the casing. This heater unit can withstand severe operating conditions such as experienced in automobiles; moreover, in this heater unit, the by-pass flow of exhaust gas is made substantially zero and the whole exhaust gas can pass through the honeycomb heater.

7 Claims, 4 Drawing Sheets

GAS FLOW DIRECTION

////// HEAT-GENERATING PORTION

GAS FLOW DIRECTION

HEATER UNIT

BACKGROUND OF THE INVENTION

(1) Field of the Invention

The present invention relates to a heater unit suitably usable for purposes such as purification of exhaust gas emitted from automobile engine, and the like.

(2) Description of Related Art

Porous ceramic honeycomb structures are known for use as a catalyst, a catalyst carrier or the like for purification of the nitrogen oxides (NOx), carbon monoxide (CO) and hydrocarbons (HC) contained in the exhaust gases emitted from internal combustion engines of automobiles, etc. In recent years, metallic honeycomb structures came to draw attention for the same purpose. Meanwhile, as the regulation of exhaust gas became stricter, it is desired to develop a heater or the like for reduction in exhaust gas during the cold start of engine.

Under the situation, a honeycomb heater comprising a metallic honeycomb structure and electrodes attached thereto for electrical heating of the structure was developed. Ordinarily, a honeycomb heater is provided in the exhaust gas flow path of automobile or the like, in the form of a heater unit comprising a metallic casing and said honeycomb heater held in the casing via an appropriate holding member.

As such a heater unit, the present applicant proposed, in Japanese Patent Application Kokai (Laid-Open) No. 259543/1995, a heater unit comprising a metallic casing and an electrically heatable honeycomb heater held in the metallic casing via a metallic holding member, wherein at least either of the boundary between the honeycomb heater and the holding member and the boundary between the holding member and the casing has been subjected to an insulation treatment and the holding member can absorb the displacement of the honeycomb heater taking place in a direction vertical to the flow direction of exhaust gas and can fix the honeycomb heater against the flow of exhaust gas.

The present applicant also proposed, in Japanese Patent Application Kokai (Laid-Open) No. 4521/1996, an improvement in the heater unit disclosed in Japanese Patent Application Kokai (Laid-Open) No. 259543/1995, that is, a flow-controlling means for keeping the by-pass flow of exhaust gas at 20% or less.

The heater unit comprising a casing and a honeycomb heater held in the casing, used in an automobile or the like must firstly have a structure for holding the honeycomb heater so that the honeycomb heater is not damaged even under severe operating conditions such as vibration, thermal impact and the like. Further in the heater unit, it is desired that the amount of the unpurified exhaust gas passing through the gap between the casing and the honeycomb heater, i.e. the by-pass flow is minimized.

With respect to the reduction in the by-pass flow, it is described, in the above-mentioned Japanese Patent Application Kokai (Laid-Open) No. 259543/1995, to provide a ceramic mat on the outer periphery (side) of a honeycomb heater for prevention of the by-pass flow of exhaust gas. However, this ceramic mat has a fear that it is worn owing to the vibration of the metallic holding member under actual use conditions, inviting gradual increase in by-pass flow.

Also, in the above-mentioned Japanese Patent Application Kokai (Laid-Open) No. 4521/1996, it is disclosed to suppress the by-pass flow of exhaust gas to 20% or less, specifically by constructing the casing so that the distance between the casing and the outer surface of the honeycomb heater became 3 mm or less at the gas inlet and/or the side of the honeycomb heater. However, making small the distance between the casing and the honeycomb heater has a limitation because of a fear of short-circuiting between the casing and the honeycomb heater.

SUMMARY OF THE INVENTION

In view of the above situation, the present invention aims at providing a heater unit comprising a casing and a honeycomb heater held in the casing, wherein the honeycomb heater is not damaged even under severe use conditions and has sufficient durability and wherein the by-pass flow of exhaust gas is prevented and the whole exhaust gas can pass through the honeycomb heater.

According to the present invention, there is provided a heater unit comprising:

a metallic casing, and a honeycomb heater held in the casing via a metallic holding member, comprising a metallic honeycomb structure having a large number of parallel passages extending in the direction of the flow of an exhaust gas passing through the heater unit and at least one electrode for electrical heating of the honeycomb structure, attached to the honeycomb structure, in which heater unit the holding member has such a structure as (1) is fitted to part of the outer surface of the honeycomb heater to allow the honeycomb heater to have a stable shape and (2) substantially blocks the flow path of exhaust gas between the honeycomb heater and the casing.

In the heater unit of the present invention, it is preferred that the holding member is fitted to the outer periphery (side) and/or the periphery of face, of the honey-comb heater. It is also preferred that the holding member and the honeycomb heater are insulated from each other via an insulating member. It is also preferred that the holding member is buried in a groove formed at the outer periphery (side) and/or the periphery of face, of the honeycomb heater, and fixed. It is also preferred that the holding member consists of at least one ring. The holding member may consists of a plurality of divided parts. It is also preferred that the holding member substantially blocks the flow path of exhaust path at the peripheral portion of the honeycomb heater which is not heated, or at the portion at the portion of the honeycomb heater which is inferior in heat-generating property to the central portion of the honeycomb heater.

BRIEF DESCRIPTION OF THE DRAWINGS

FIG. 2(a) is a plan view and FIG. 2(b) is a side view

DETAILED DESCRIPTION OF THE PREFERRED EMBODIMENT

Figure 1:
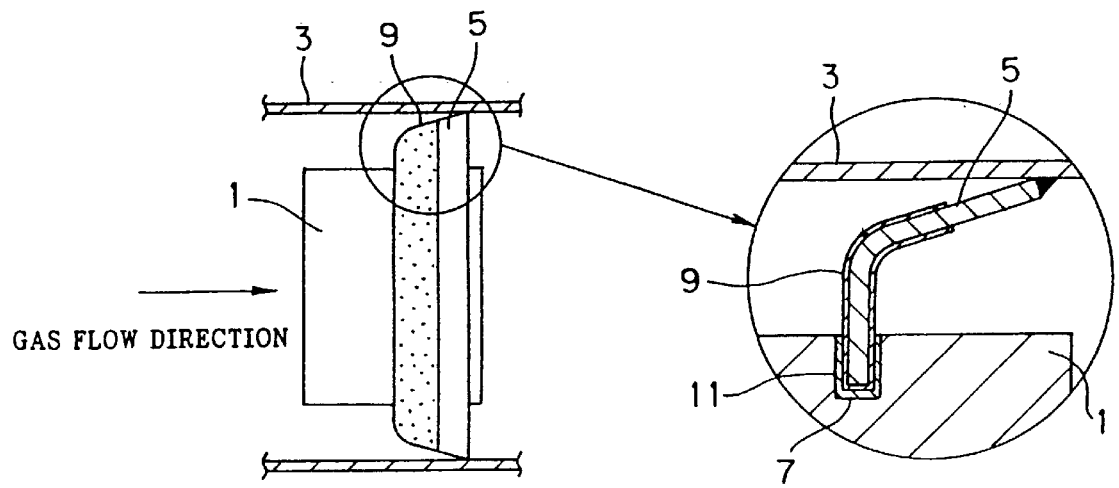
FIG. 1 is drawings showing an embodiment of the heater unit of the present invention

The heater unit of the present invention includes a casing and a honeycomb heater held in the casing via a holding member, constructed so that: (1) the heat unit has sufficient durability even under severe use conditions of automobile or the like; and (2) there is substantially no by-pass flow between the casing and the honeycomb heater, and the whole between the casing and the honeycomb heater, and the whole by-pass can pass through the honeycomb heater. The present invention is described below in detail with reference to the accompanying drawings.

The heater unit of the present invention comprises a honeycomb heater comprising a metallic honeycomb structure having a large number of parallel passages and at least one electrode for electrical heating of the honeycomb structure, attached to the honeycomb structure. The material of the honeycomb structure can be metallic material which can generate heat when electrified. It is preferably a material having a Fe—Cr—Al type composition superior in heat resistance and oxidation resistance, in view of the conditions (e.g. high temperatures of automobile exhaust gas) to which the honeycomb structure is exposed.

With respect to the cell shape of the honeycomb structure, i.e. the passage sectional shape of the honeycomb structure in a direction vertical to the lengthwise direction of the passages, there is no particular restriction. However, it is preferably a shape such as polygon (e.g. hexagon or higher polygon), corrugated shaped or the like (which is more flexible to strectching or shrinkage than triangle or tetragon), in view of the thermal impact resistance required for the honeycomb structure. There is no particular restriction, either, with respect to the cell number of the honeycomb structure. However, the cell number is preferably 100 to 1,500 cell/in.$^2$ in view of the thermal conductivity and exhaust gas purifiability of the honeycomb structure. With a cell number exceeding 1,500 cells/in.$^2$, there is a high possibility that a problem arises with respect to the pressure loss of exhaust gas.

As the honeycomb structure, there can be used a wound type obtained by attaching a corrugated sheet to a rolled foil and winding the resulting material, or an extrudate type obtained by powder metallurgy and extrusion, with the latter type being preferred from the standpoint of the structural durability. Typical examples of the honeycomb structure are shown in Japanese Patent Application Kokai (Laid-Open) No. 295184/1991 and WO 10471/1989.

To the honeycomb structure is attached at least one electrode for electrical heating of the honeycomb structure. In order to apply a desired electric power to the honeycomb structure to generate a desired heat therein, it is generally necessary to adjust the resistance of the honeycomb structure. Hence, it is preferable to form a resistance-adjusting means, for example, slits [described in Japanese Patent Application Kokai (Laid-Open) No. 295184/1991] in the case of the extrudate type honeycomb heater. When such a honeycomb structure (a honeycomb heater) is used as a catalytic converter, a catalyst is generally loaded thereon.

In the following, description is made mainly on the honeycomb heater having slits formed therein. The slits refer to all kinds of slits formed in a honeycomb heater for resistance adjustment, and may be linear or curved. With respect to the honeycomb heater in which slits are to be formed, there is no particular restriction as to the production method; and slits can be formed in any of, for example, a wound type and an extrudate type both mentioned above.

The honeycomb heater is accommodated in a metallic casing so that the lengthwise direction of the passages of the honeycomb heater becomes parallel with the direction of the flow of the exhaust gas passing in the casing. That is, the lengthwise direction of the passages of the honeycomb heater becomes parallel with the lengthwise (thickness) direction of the casing; consequently, most exhaust gas passes through the passages of the honeycomb heater. The casing is a cylinder into which the honeycomb heater can be inserted, and an example thereof is a metallic cylinder. The sectional shape of the casing in a direction vertical to the lengthwise direction is not restricted to a circle and can be appropriately determined so as to match the shape of the honeycomb heater.

In the present invention, in fixing the honeycomb heater in the casing, first a metallic holding member is fitted to the outer surface of the honeycomb heater. When the honeycomb heater has slits (for resistance adjustment) formed therein, the slits often show expansion or shrinkage, making the external shape of the honeycomb heater unstable, in many cases. Therefore, the fitting of the holding member can stabilize the shape of the honeycomb heater, and moreover suppresses the movement (e.g. expansion or shrinkage) of slits and allows the honeycomb heater to have higher durability.

FIG. 1 is a drawing showing an embodiment of the heater unit of the present invention, wherein a honeycomb heater 1 is fitted to a casing 3 via a peripheral holding member 5. The inner edge of the ring-shaped peripheral holding member 5 is buried in a peripheral groove 7 formed on the side of the honeycomb heater 1, and fixed to the honeycomb heater 1 so that the gap between the peripheral holding member 5 and the honeycomb heater 1 becomes minimum. The outer edge of the peripheral holding member 5 is fitted to the inner surface of the casing 3 so that the gap between the peripheral holding member 5 and the casing 3 becomes minimum. The fixing between the peripheral holding member 5 and the casing 3 is ordinarily conducted by welding, and total welding or partial welding (spot welding) is used appropriately. Incidentally, the honeycomb heater 1 has slits (for resistance adjustment) formed therein.

The material for the peripheral holding member 5 is a metal. Since the material for the honeycomb heater 1 is generally a metal having a thermal expansion coefficient as large as $10 \times 10^{-6}$ to $20 \times 10^{-6}/°$ C., a metal having about the same thermal expansion coefficient is used as the material for the peripheral holding member 5. By matching the thermal expansion coefficients of the two materials, it is possible to reduce the stress caused by the difference in thermal expansion coefficient between the peripheral holding member 5 and the honeycomb heater 1.

For example, when the honeycomb heater 1 is made of ferrite, the peripheral holding member 5 is preferably made of a heat-resistant steel such as ferrite, austenite or the like. Since the outer periphery of the honeycomb heater 1 has a lower temperature than the central portion of the honeycomb heater 1, use of austenite having a high thermal expansion property can reduce the thermal stress generated between the honeycomb heater 1 and the peripheral holding member 5. The holding member 5, preferably has a heat resistance equivalent to that of the honeycomb heater 1. However, since the peripheral holding member 5, is fitted to part of the outer surface of the honeycomb heater 1, the heat resistance of the peripheral holding member 5, need not be as high as that of the honeycomb heater 1 and can generally be 600° C. or higher.

An insulating area must be formed at the boundary between the metallic peripheral holding member 5 and the honeycomb heater 1 to avoid their mutual contact via the insulating area. Formation of such an insulating area can be conducted by, as shown in FIG. 1, forming, by coating, an insulating film (e.g. a ceramic film) 9 on the outer surface of a holding member 5 and then filling an insulator 11 between the peripheral holding member 5 and a honeycomb heater 1.

Formation of the insulating film 9 on the peripheral holding member 5 is conducted by thermal spraying, electrostatic coating, dipping or the like. As the insulator 11, there are used a heat-resistant inorganic adhesive, a heat-resistant mortar, a glassy cloth, etc. As the insulator 11, a heat-resistant inorganic adhesive is most preferred because it can fix the honeycomb heater 1 strongly. It is not always necessary to use both the insulating film 9 and the insulator 11, and only either of them may be used as long as insulation and durability are ensured between the peripheral holding member 5 and the honeycomb heater 1.

Figure 2:
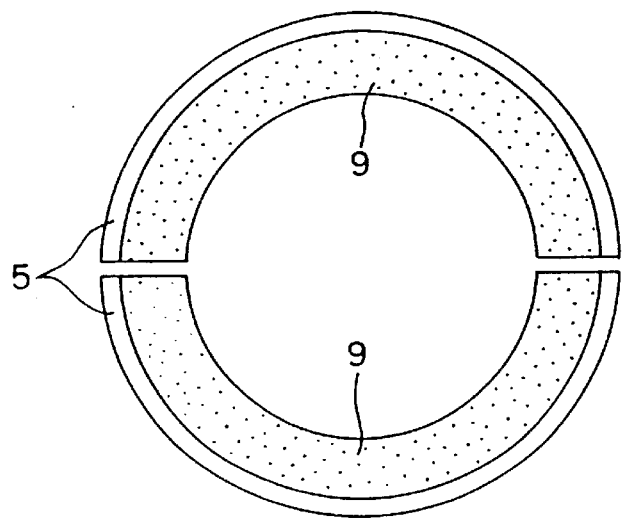
FIG. 2(a) and FIG. 2(b) are drawings showing an example of the holding member used in the present invention.
Figure 2:
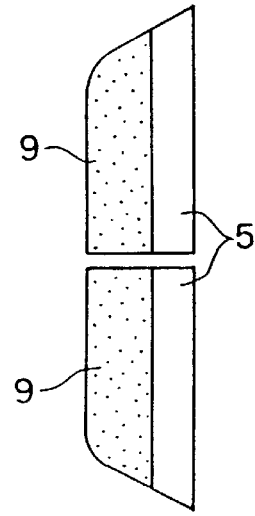

In FIG. 1, the peripheral holding member 5 is shown like a single ring. In actual production, the holding member 5 ordinarily consists of two or more parts and they are provided in the peripheral groove 7 of the honeycomb heater 1, in a connected state. FIG. 2(*a*) (plan view) and FIG. 2(*b*) (side view) show a peripheral holding member 5 consisting of two half rings, and each half ring has a ceramic insulating film 9 on the inner periphery of the peripheral holding member 5 which is fitted to the honeycomb heater via the insulating film 9. These plural parts need not be bonded at the boundaries by welding or the like as long as they can fasten the honeycomb heater 1 strongly in a casing.

Figure 3:
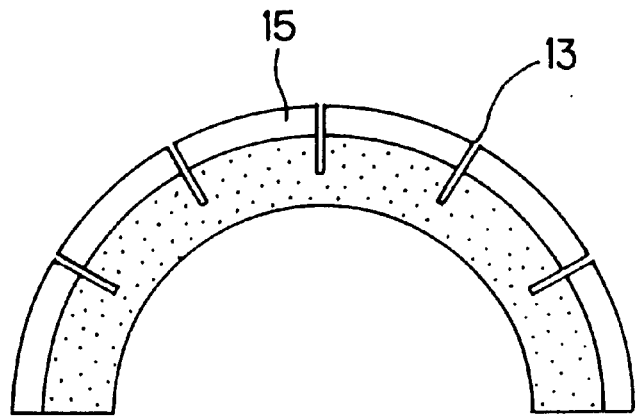
FIG. 3 is a plan view showing an example of the holding member with slits, used in the present invention.
Figure 4:
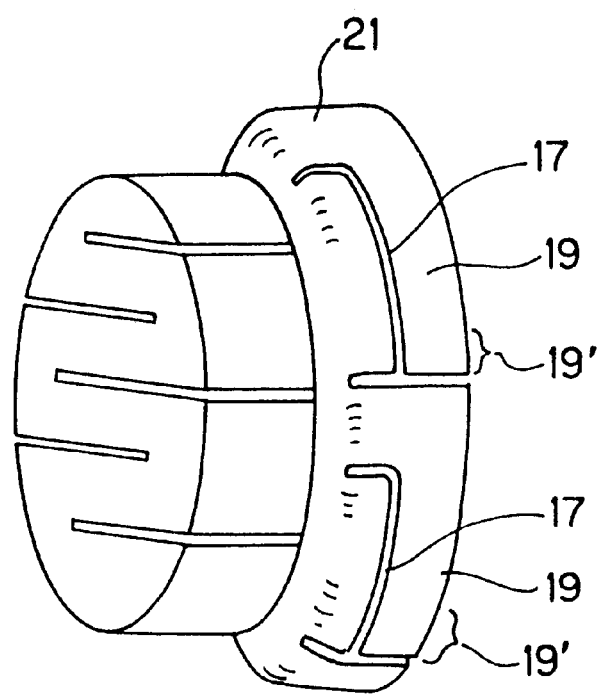
FIG. 4 is a perspective view showing other example of the holding member with slits, used in the present invention

In the holding member may be formed slits so that the holding member can have flexibility and the stress applied to the honeycomb heater can be reduced. FIG. 3 is an example of the holding member having slits formed therein for stress reduction. In this example, radial slits 13 are radially formed in a radially slitted holding member 15 consisting of a half ring. FIG. 4 is also an example of the holding member having slits formed therein for stress reduction. In FIG. 4, formation of a plurality of leg defining slits 17 in a peripherally slitted holding member 21 results in formation of legs 19 of rectangular shape in the peripherally slitted holding member 21, and only an area 19' of the front end of each leg 19 is fitted to a casing; thereby, the peripherally slitted holding member 21 can have good flexibility. When slits are formed in a holding member, a by-pass flow arises through the slits; however, the by-pass flow can be made negligibly small by controlling the width of each slit at about 1 mm.

In fitting the holding member to the honeycomb heater, it is also possible to force a honeycomb heater into a one-piece ring as holding member to allow the honeycomb heater to have a stable shape. In this case, however, there is a fear that the insulation and fitting between the ring and the honeycomb heater are insufficient.

Figure 5:
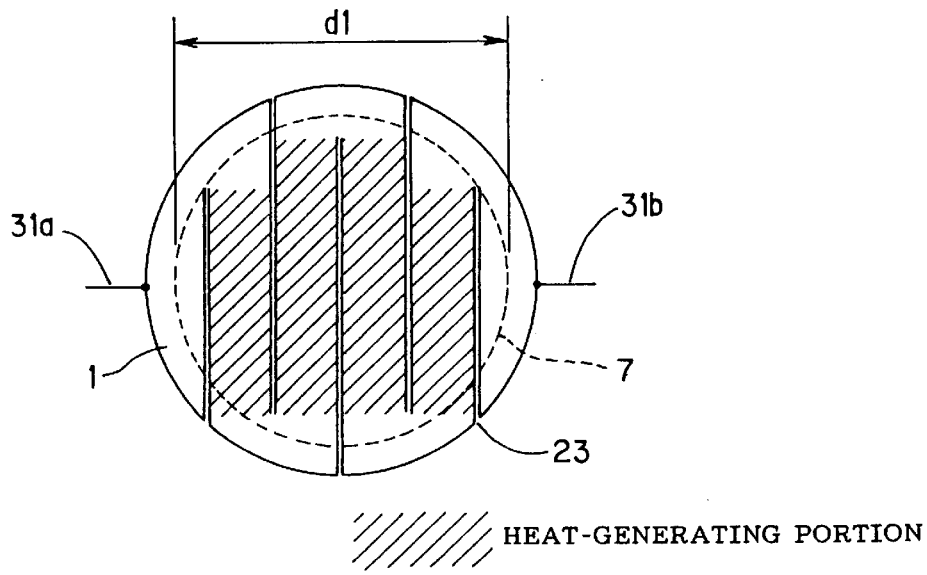
FIG. 5 is a plan view showing the honeycomb heater of the present invention having a groove for holding member, formed at the outer periphery (side).

As shown in FIG. 5, in a honeycomb heater 1 wherein transverse slits 23 for resistance adjustment are formed in a honeycomb structure between electrodes 31*a* and 31*b*, an electric path is formed between the slits 23 and heat is generated. However, when, as in the case of the embodiment of FIG. 1, a ring-shaped peripheral groove 7 is formed at the outer periphery (side) of the honeycomb heater 1 and a holding member 5 is buried in and fixed to the peripheral groove 7, it is preferred to set the diameter d1 of the groove 7 so that substantially all the honeycomb heater portion inside the peripheral groove 7 becomes a heat-generating portion.

When the peripheral holding member 5 is buried in the peripheral groove 7 having such a diameter, the peripheral holding member 5 substantially blocks the flow path of exhaust gas at the peripheral portion of the honeycomb heater 1 which is not heated, or at the portion of the honeycomb heater 1 which is inferior in heat-generating property to the central portion of the honeycomb heater 1; as a result, the whole exhaust gas passing through the honeycomb heater 1 can be heated and favorable emission control is achieved.

In the present invention, the holding member has such a structure as (1) allows a honeycomb heater to have a stable shape and holds the honeycomb heater in a casing and (2) substantially blocks the flow path of exhaust gas between the honeycomb heater and the casing. Therefore, the shape and dimension of the outer periphery of the holding member is made nearly conformable to the shape and dimension of the inner surface of the casing to which the holding member is fitted. The holding member is fitted to the casing by means of welding or the like. The holding member preferably has a skirt-like shape as shown in FIG. 1, whereby the holding member can have a spring property as compared with a flat plate, making it possible to absorb the displacement of honeycomb heater 1 caused by its expansion and shrinkage in the radial direction and also suppress the displacement in the axial direction.

Figure 6:
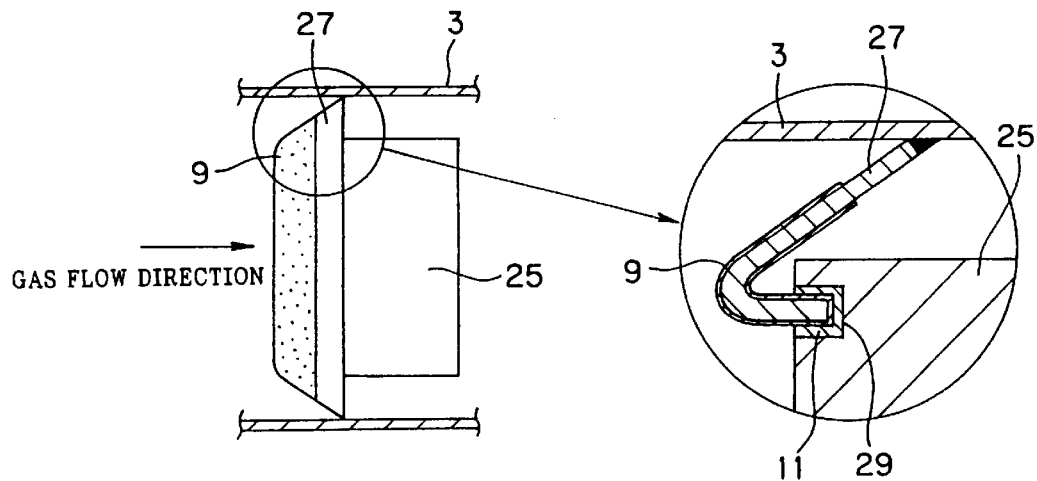
FIG. 6 is drawings showing other embodiment of the heater unit of the present invention.

In the present invention, the position of fitting the holding member is not restricted to the outer periphery (side) of the honeycomb heater as in the above embodiment. For example, as shown in FIG. 6, it is possible to form a ring-shaped end groove 29 in a honeycomb heater 25 at an area of the end of the honeycomb heater 25 in its lengthwise (thickness) direction (the end is hereinafter referred to simply as face), close to the outer periphery (side) of the honeycomb heater 25, i.e. at the periphery of face and fix a ring-shaped holding member 27 matching the end groove 29, in the end groove 29.

Figure 7:
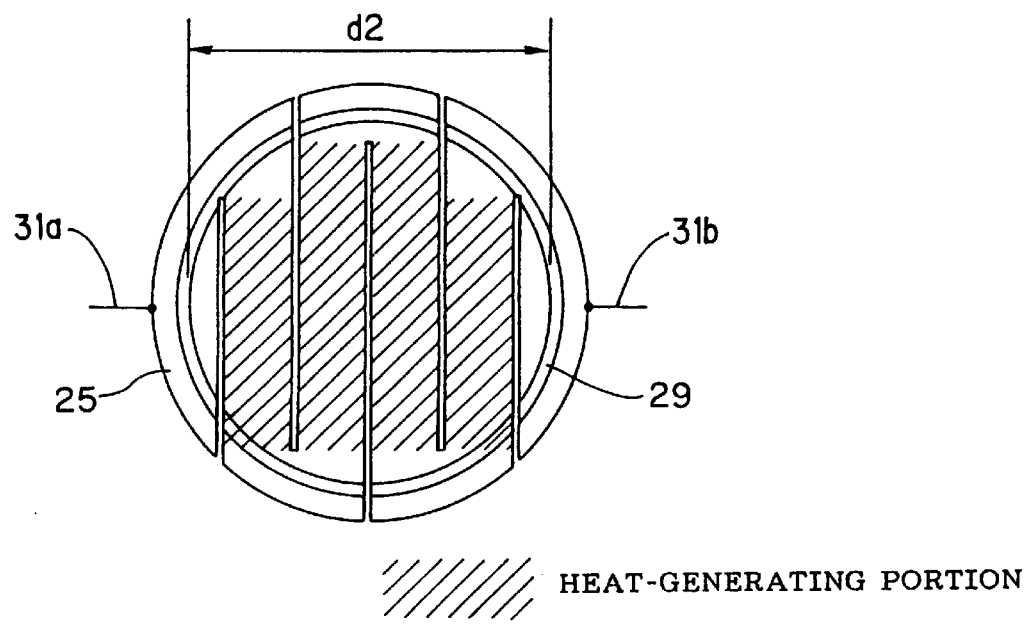
FIG. 7 as a plan view showing the honeycomb heater of the present invention having a groove for holding member, formed at the periphery of face.

In this case, it is preferred to set the diameter d2 of the end groove 29 so that substantially all the honeycomb portion inside the end groove 29 becomes a heat-generating portion, as shown in FIG. 7. When the edge holding member 27 is buried in the end groove 29 having such a diameter, the edge holding member 27 substantially blocks the flow path of exhaust gas at the peripheral portion of the end-fixed honeycomb heater 25 which is not heated, or at the portion of the end-fixed honeycomb heater 25 which is inferior in heat-generating property to the central portion of the end-fixed honeycomb heater 25; as a result, the whole exhaust gas passing through the end-fixed honeycomb heater 25 can be heated and favorable emission control is achieved.

In holding such a end-fixed honeycomb heater 25 in a casing 3, the edge holding member 27 may be fitted to the end-fixed honeycomb heater 25 at the exhaust gas-incoming side or the exhaust gas-leaving side. The holding member 27 may be fitted to one face or both faces of the end-fixed honeycomb heater 25.

In the above have been described embodiments of the present invention in detail. Needless to say, the present invention is in no way restricted to these embodiments. It should be understood that various changes, modifications, improvements, etc. can be made based on the knowledge of those skilled in the art, as long as they do not depart from the scope of the present invention.

As stated above, in the heater unit of the present invention comprising a honeycomb heater and a casing therefor, the honeycomb heater has high shape stability and high durability because a holding member is fitted to the honeycomb heater. Further, since the holding member has such a structure as substantially blocks the flow path of exhaust gas between the honeycomb heater and the casing, there is substantially no by-pass flow of exhaust gas, in the present heater unit. Therefore, when mounted on an automobile, the present heater unit has high durability and shows an excellent exhaust gas purifiability during the cold start of engine.

What is claimed is:

1. A heater unit comprising:

a casing having an inner surface;

a honeycomb heater, comprising (1) a honeycomb structure having a continuous circumferentially extending groove in an outer surface thereof, the honeycomb structure having opposite end faces at which a large number of parallel passages open and extend in the direction of the flow of an exhaust gas passing through the heater unit and said honeycomb structure having a peripheral face extending between said end faces, (2) at least one electrode attached to the honeycomb structure for electrical heating of the honeycomb structure, and (3) a ring-shaped metallic holding member extending around the honeycomb structure and substantially blocking flow of the exhaust gas between the heater and the casing and attaching the honeycomb structure inside the casing, the inner edge of the holding member coated with an insulating film, the film covering a majority of the surface of the holding member, the ring-shaped holding member having a first portion that has a tapering skirt and is fixed at its large diameter end to the casing and a second portion that joins the small diameter end of said first portion and is an inner periphery of the ring-shaped holding member received in said groove so that the honeycomb heater has a stable shape and the holding member has an outer periphery with a shape and dimension substantially equal to the shape and dimension of the inner surface of the casing, said groove being formed in either one of said end faces or said peripheral face of the honeycomb structure, and a layer of electrical insulation material between the holding member and the honeycomb structure in said groove.

2. The heater of claim 1, wherein the groove is filled with an insulator between the honeycomb structure and the holding member.

3. The heater of claim 1, wherein the holding member is divided into at least two sections, which sections form a complete ring when placed around the honeycomb structure.

4. The heater of claim 1, wherein the outer surface is an outside peripheral surface, and the groove is a peripheral groove in the peripheral surface, and the holding member is a peripheral holding member.

5. The heater of claim 1, wherein the outer surface is a gas receiving end-face of the honeycomb structure, and the groove is an end groove in the gas receiving end-face of the honeycomb structure, whereby the holding member is an edge holding member.

6. The heater of claim 1, wherein the slits are "L" shaped leg defining slits, wherein the "L" shape extends axially inwardly from the outer edge of the holding member.

7. The heater of claim 1, wherein the end of the honeycomb structure initially receiving the flow of exhaust gas includes a plurality of parallel slits, with said at least one electrode further comprising electrodes attached to opposite sides of the honeycomb structure, the electrodes positioned so that an axis between the positioned electrodes is perpendicular to the parallel slits, whereby the end having the slits is a heat generating portion.

* * * * *